United States Patent [19]

Allport

[11] 4,083,002

[45] Apr. 4, 1978

[54] METHOD AND APPARATUS FOR MEASURING CROSS SECTIONAL AREA AND WEIGHT PER UNIT LENGTH OF ELONGATED, CONDUCTIVE MATERIAL BY MAGNETIC FIELD DISPLACEMENT

[76] Inventor: John J. Allport, 12298 Candy Ct., Saratoga, Calif. 95070

[21] Appl. No.: 658,247

[22] Filed: Feb. 17, 1976

[51] Int. Cl.² .......................................... G01R 33/12
[52] U.S. Cl. .................................... 324/227; 324/232; 324/240
[58] Field of Search ............ 324/34 R, 34 PS, 34 TK, 324/40, 37

[56] References Cited

U.S. PATENT DOCUMENTS

| 2,894,203 | 7/1959 | Cory | 324/40 |
| 3,056,081 | 9/1962 | Hochschild | 324/37 |
| 3,502,968 | 3/1970 | Tobin, Jr. et al. | 324/40 |

FOREIGN PATENT DOCUMENTS

| 1,505,716 | 12/1967 | France | 324/34 R |
| 2,264,129 | 7/1973 | Germany | 324/34 PS |
| 596,182 | 12/1947 | United Kingdom | 324/37 |
| 858,283 | 1/1961 | United Kingdom | 324/34 TK |

*Primary Examiner*—Robert J. Corcoran
*Attorney, Agent, or Firm*—Thomas Schneck, Jr.

[57] ABSTRACT

A method and apparatus is disclosed whereby a solenoid coaxially surrounding an elongated electrically conducting material generates a radio frequency magnetic field of such a frequency that the material within excludes or displaces magnetic lines of force therefrom. One or more search coils are mounted coaxially within the solenoid, but outside of the material. By comparing the signal induced in the search coils when the material is present with the signal induced in the search coils when the material is absent, the outer cross sectional area of the material may be measured by measuring magnetic field exclusion or displacement, from the search coil and from this data, weight per unit length of solid material may be inferred. Furthermore, a pattern of deformations on the material may also be inferred, when the material is moving at known speed, from any high frequency modulation of the signal picked up by the search coil. When the mean mass per unit length of hollow elongated materials is known the mean wall thickness may be inferred.

11 Claims, 6 Drawing Figures

METHOD AND APPARATUS FOR MEASURING CROSS SECTIONAL AREA AND WEIGHT PER UNIT LENGTH OF ELONGATED, CONDUCTIVE MATERIAL BY MAGNETIC FIELD DISPLACEMENT

BACKGROUND OF THE INVENTION

1. Field of the Invention

The invention relates to a method and apparatus for measuring a cross sectional area and other dimensional properties of elongated conducting material and more particularly to a radio-frequency magnetic measuring method and apparatus for determing the area and weight per unit length of elongated material. The method and apparatus is useful in the measurement of solid and hollow conducting bar type products such as steel reinforcing bars as well as solid and hollow shaped bars of steel, aluminum, brass, copper and other conductors as they are manufactured.

2. Prior Art

In the field of nondestructive testing by magnetic means, it is known to use a primary solenoid for inducing a magnetic field in solid and hollow type materials and then measuring the extent and properties of such induction by a secondary coil enclosing or located near the primary material. Such measurements rely on eddy current effects within the bar type material which set up a secondary alternating current magnetic field in the secondary coil. The phenomenon is explained in the book, "Nondestructive Testing Handbook" by R. C. McMaster, Ronald Press (1959), Section 36, incorporated by reference herein. Patents which show prior art methods and apparatus for magnetic testing of bar type materials include U.S. Pat. Nos. 2,097,947; 2,555,853; 2,649,573; 3,142,796; and 3,560,845. The methods and apparatus described in the aforementioned book and patents relate to systems wherein the magnetic field penetrates the bar type material to generate eddy currents, whose influence is measured by external measuring apparatus.

In such systems the magnetic field strength as well as variabilities in the permeability and conductivity of the material may severely influence the measurement being made. In prior art systems, eddy currents which are set up generate magnetic fields which are out of phase with the main signal impressed on the primary solenoid. Such out of phase signals may be employed to detect defects such as cracks and occlusions in the material, as well as variations in permeability and conductivity.

It is an object of the present invention to provide a method and apparatus for detecting dimensional properties of elongated electrically conducting materials by means of a magnetic nondestructive testing apparatus in which a magnetic field indicative of the dimensional properties of the elongated material is in phase with the magnetic field inducing it, thereby eliminating reliance on eddy current effects.

SUMMARY OF THE INVENTION

The above object has been achieved by means of an excitation solenoid which co-axially surrounds the elongated material and one or more search coils coaxially within the excitation solenoid, but coaxially external to the material. I have found that a radio frequency excitation current in the excitation solenoid is nearly ideal for generating a magnetic field having uniform field strength within the solenoid and near the periphery of the material without penetrating the bar itself. The magnetic flux is sensed by the search coil both in the presence and absence of the material. Because the field is displaced or excluded from the material due to the vanishingly small skin depth existing at radio frequencies, the flux through the search coil is indicative of the outer cross sectional area of the material. Because essentially none of the field lines penetrate the material, the flux detected by the search coil remains in phase with that generated by the exciting solenoid. Since the density of the material is known, the weight per unit length may be inferred in the case of solid materials. When the weight per unit length is known in the case of hollow materials the wall thickness may be inferred.

DESCRIPTION OF THE PREFERRED EMBODIMENT

Figure 1:
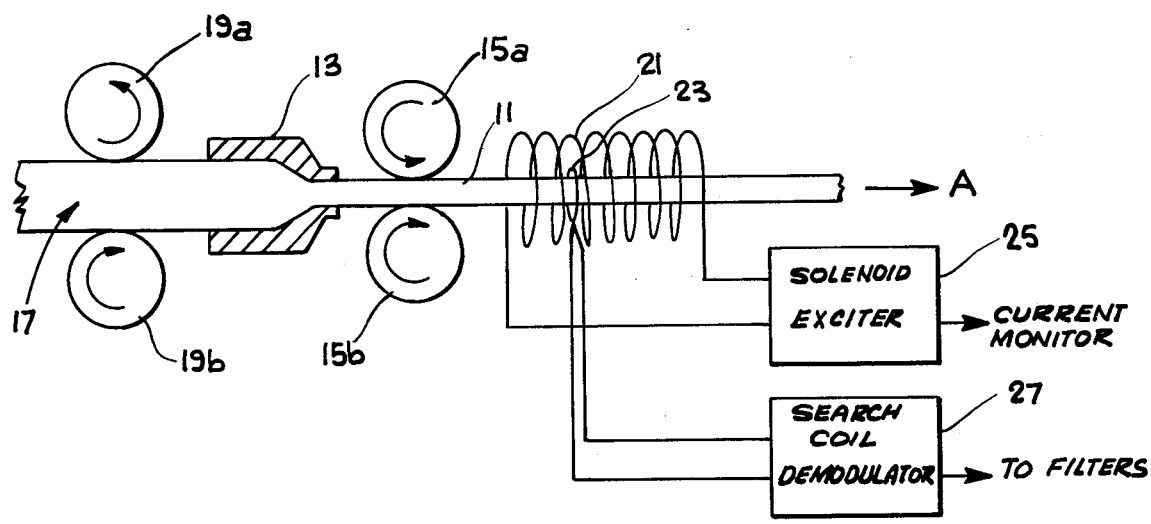
FIG. 1 is a simplified plan view of the apparatus of the present invention.

FIG. 1 shows apparatus of the present invention operating on elongated electrically conducting solid material 11, which is emerging from a continuous process rolling mill or extruder 13 or the like and advanced at a known rate past tachometer rollers 15a, 15b from a supply of larger stock material 17 which is being measured by the idler rollers 19a, 19b. Reference to a solid bar is exemplary; a hollow material could also be used. The stock material 17 is forced into the rolling mill or extruder 13 by means of other apparatus, not shown. As elongated bar type material 11 moves in the direction of the arrow A, it passes through an excitation solenoid 21 which coaxially surrounds the bar type material 11 along the unit length thereof. Coaxially within the excitation solenoid 21 is a smaller diameter coil 23, termed a search coil, which serves to pick up the magnetic field flux induced within its diameter.

The excitation coil 21 is supplied with a very high frequency, $f_1$, alternating current, approximately 100 MHz, and a lower frequency alternating current, $f_2$, approximately 10 MHz. At the higher frequency, $f_1$, the magnetic field induced within the excitation solenoid 21 is substantially excluded from the bar type material 11, regardless of whether or not the bar type material is ferromagnetic or hollow. The reason for this is that at the very high frequency mentioned, the skin depth for conducting materials is very shallow thereby substantially excluding r.f. magnetic field lines from the bar interior.

The search coil demodulator 27 receives a radio frequency current from coil 23, which has been induced therein by the changing magnetic flux encompassed within the coil 23. This field has a first frequency component associated with the magnetic field lines about the bar type material 11 induced by the excitation coil 21. The magnitude of the radio frequency current is reduced due to the exclusion of magnetic field lines from bar 11 due to the shallow skin depth at the high frequencies at which coil 21 is operated. Other, lower frequency components are picked up by coil 23 as modulation on the radio frequency current and are associated with bar surface deformation patterns which perturb the magnetic fields on a quasi regular basis. Such deformations may be angular or annular bands on the bar type material, such as exist on steel reinforcing bar. If, for example, the bar type material has one deformation every 2 inches and is passing through the excitation coil 21 at the rate of 3000 feet per minute, there will be a high frequency signal of approximately 300 Hz modulated on the field signal and having an amplitude which depends on the height of the deformation.

Demodulator 27 demodulates the radio frequency signal from coil 23 and produces a voltage output proportional to the r.f. flux at $f_1$ linking coil 23 and coil 21. The signal from demodulator 27 has frequency components extending from d.c. to many thousands of hertz. The low frequency components relate to the average cross section of the bar. The higher frequency components relate to the deformations and their height. Demodulator 27 also demodulates the r.f. signal to produce a demodulated signal proportional to the flux linking coil 23 at the lower signal frequency $f_2$. The signal corresponding to the linkage at $f_2$ is used for fine correction of the measurement.

The cross sectional areas of the excitation coil 21 and the search coil 23 are important parameters for determining the cross sectional area of the bar type material which is co-axially within these two coils.

The relation between the cross sectional area of the bar type material 11 and the voltage induced in the search coil 23 may be expressed by the equation $V_B = K(A2-A1/A3-A1)$ where $V_B$ is the induced voltage in the search coil 23; $V_O$ is the induced voltage in the search coil when no bar is present $[V_O = K(A2/A3)]$; $K$ is a constant of proportionality; $A3$ is the cross sectional area of the excitation solenoid 21; $A2$ is the cross sectional area of the search coil 23; $A1$ is the mean (or instantaneous) cross sectional area of bar material 11. If the above equation is solved for $A1$, the common result is obtained $$A_1 = A_2 \left[ \frac{\left(1 - \frac{V_B}{V_o}\right)}{\left(1 - \Delta \frac{V_B}{V_o}\right)} \right]$$

where $$\Delta = (A2/A3)$$

If the excitation solenoid 21 is much larger in cross section than the search coil 23, the above equation becomes: $A1 = A2 (1 - V_B/V_O)$. However, in practice, $\Delta$ has a finite value and the transfer function does not rely upon $\Delta$ approaching zero.

Space limitations generally may restrict the diameter of excitation solenoid 21. For a mill producing bar type material having a mean diameter in the range 0.25 inches to 1.00 inches an excitation coil diameter of 6 inches offers a compact configuration. For such a diameter, the corresponding search coil diameter should be in the range of approximately 1.5 inches to 2 inches in diameter.

For high precision in the measurements it is necessary to accurately calibrate the apparatus prior to use. Calibration is accomplished by means of the insertion of electrically conducting bar type material of a variety of accurately known cross sections spanning the measurement range. Such bars may be prepared, for example, by turning solid copper bars on a lathe to a uniformly accurate measured diameter (and therefore accurately known cross sectional area). A sample of such bar type material is coaxially pulled through the excitation solenoid and search coil and the response signal in the search coil is plotted. Such a response curve may be expressed as a polynomial having the following form:

$$A_{BAR} = \sum_{n=0}^{m} a_n \left(1 - \frac{V_B}{V_o}\right)^n$$

Using this polynomial, deformed bars of known mean cross sectional area, with known length, weight and density, representative of the product to be measured are also inserted coaxially within the excitation and search coils and readings are made of the voltages induced in the search coil 23, normalized with respect to a reading in the absence of the bar, $V_O$, at a number of points along the specimen length. The readings for each specimen are averaged and compared to the reading of a perfect bar for the same mean cross sectional area as determined from either a calibration response curve plot or the above mentioned polynomial response. The ratio, $S_{1k}$, between the average of the readings and a reading of the perfect bar is a quantity to be preserved, for example in a memory media, for each type of bar. When the sensor is used to measure the $k$ th type of bar during its production the equation will then be:

$$A_{1K} = \sum_{n=0}^{m} a_n \left[1 - (S_{1K}) \frac{V_{1b}}{V_{1o}}\right]^n$$

Many types of bars are at elevated temperatures when they are made, with accompanying decreases in conductivity and magnetic permeability. As a result the skin depth in the material increases somewhat from that at the room temperature of the calibration. To remove this potential source of error, essentially an eddy current effect which is undesirable, the sensor is also calibrated at a frequency $f_2$ which is much lower than the primary measurement frequency $f_1$. The apparent mean cross sectional area of the bar at this frequency is:

$$A_{2k} = \sum_{n=0}^{m} b_n \left(1 - S_{2k} \frac{V_{2B}}{V_{2o}}\right)^n$$

Under all conditions the cross sectional area of the bar is, of course, instantaneously constant and $$A_{1K} + P\delta_1 = A_{2K} + P\delta_2 = \text{TRUE BAR CROSS SECTION AREA}$$

where $p\delta_1$ and $p\delta_2$ are the skin areas in the bar penetrated, respectively, by the flux at frequencies $f_1$ and $f_2$ where $p$ is the bar perimeter and $\delta$ the skin depth. Since only the frequencies are different, and since $$\delta_2 = \left(\frac{f_1}{f_2}\right)^{\frac{1}{2}} \delta_1,$$

it may be shown that the cross sectional area of the bar, $A_k$, is $$A_K = A_{1K}\left[1 + \frac{\left(1 - \frac{A_{2K}}{A_{1K}}\right)}{\left(\frac{f_1}{f_2}\right)^4 - 1}\right]$$

Finally, since the quantity desired is the weight per unit length at normal conditions rather than at the elevated manufacturing temperature, the measurement must be corrected for the bar shrinkage which occurs upon cooling. The weight per unit length is:

$$\frac{W}{l} = \frac{\rho_o{}^*A_{HOT}}{[1 + \alpha(T_m - T_o)]^2} \text{ OR } \frac{W}{l}\bigg]_{COLD} = \frac{\rho_o{}^*A_K}{[1 + \alpha(T_m - T_o)]^2}$$

where $\rho_o$ is the material density at laboratory temperature, $T_o$ is the laboratory temperature, $T_m$ is the bar temperature during measurement in the manufacturing process, and $\alpha$ is the linear thermal expansion co-efficient of the material. $T_o$ and $\alpha$ are lab determined calibration constants, stored in the memory unit for the particular material. $T_m$ is accurately measured and entered into the processor module via an analog to digital converter as described below.

Finally, comparison of lab measurements of samples of the bar to the W/l measured during manufacture may show some "dynamic" but constant error, depending on the type of bar and material as well as unaccounted-for manufacturing conditions. This final error is removed by including the constant $B_K$ in the data in the memory unit, where $B_K$ is the difference between the laboratory determination and the dynamic, on-line, measurement.

The true weight per unit lenght (W/l) of a deformed bar is given by the following formula:

$$\frac{W}{l}\bigg]_K = \frac{\rho_{oK}(1 + B_k)}{[1 + \alpha[T_m - T_o]^2}\left[1 + \left(1 - \frac{\sum_{n=0}^{m} b_n\left(1 - S_{2K}\frac{V_{2B}}{V_{20}}\right)^n}{\sum_{n=0}^{m} a_n\left(1 - S_{1K}\frac{V_{1B}}{V_{10}}\right)^n}\right)\left(\left(\frac{f_1}{f_2}\right)^4 - 1\right)^{-1}\right] \times \left[\sum_{n=0}^{m} a_n\left(1 - S_{1K}\frac{V_{1b}}{V_{10}}\right)^n\right]$$

The above equations represent algorithms carried out in processor module 51 from inputs derived from connected transducers and from signals stored within the processor.

Figure 2:
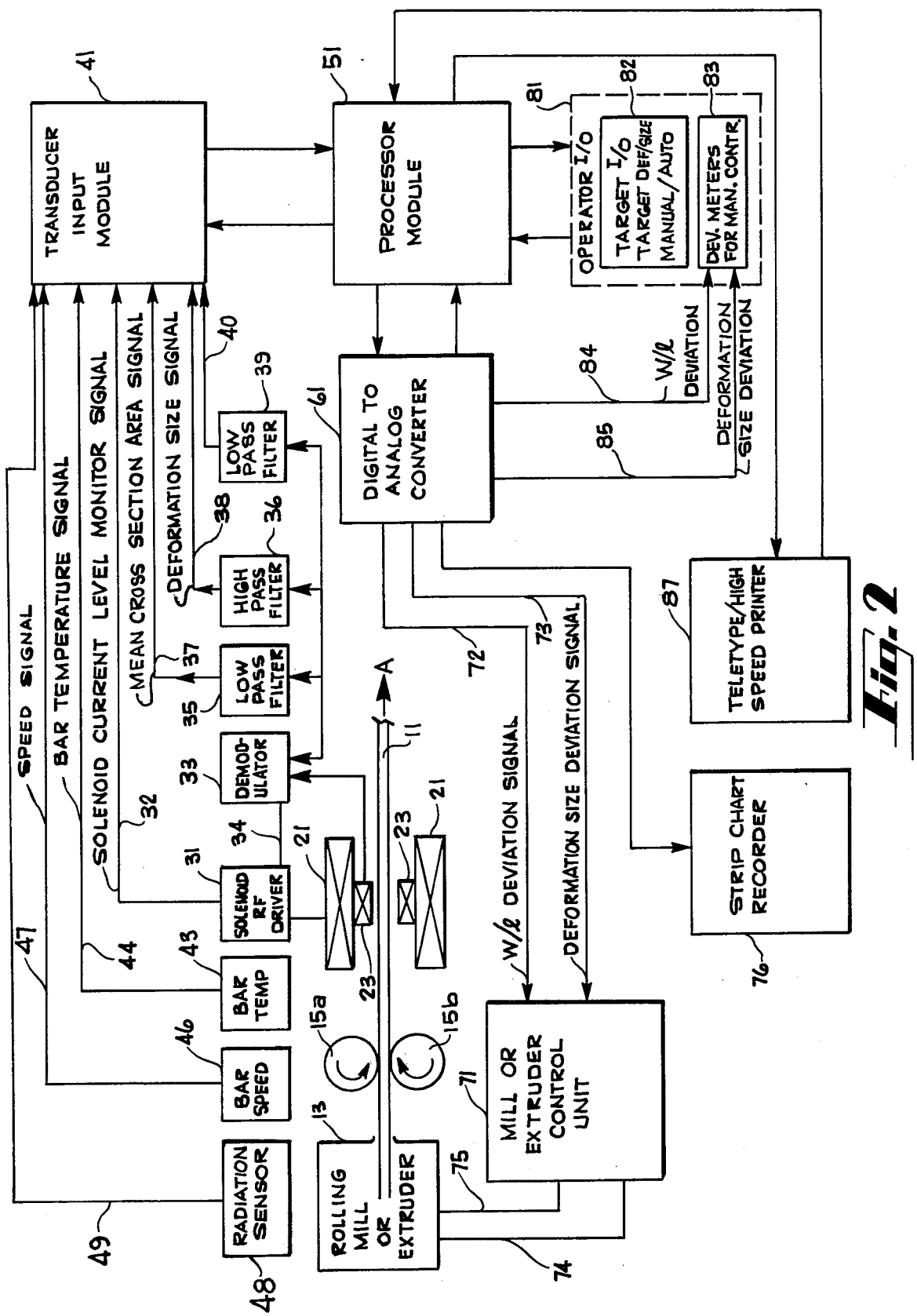
FIG. 2 is the detailed plan view of the apparatus of the present invention.

Operation of the apparatus of the present invention may be understood with reference to FIG. 2. In FIG. 2 the rolling mill or extruder is seen to produce a bar type material 11 travelling in the direction indicated by arrow A coaxially through the center of the excitation coil 21 and the search coil 23. The excitation coil 21 is excited by a solenoid radio frequency driver 31 which is a radio frequency oscillator for generating a magnetic field strength within solenoid 21 at a frequency $f_1$ of approximately 100 MHz (and also at a lower frequency $f_2$ of approximately 10 MHz). The search coil 23 picks up a signal corresponding to the magnetic field passing through the center thereof which is modulated by the non-uniformities in the bar type material. A demodulator 33 demodulates the r.f. current from coil 23 at frequencies $f_1$ and $f_2$. The signal demodulated at $f_1$ is broken into high and low frequency components by high pass filter 36 and low pass filter 35. Demodulator 33 also detects the zero phase shift signal (with reference to the signal existing when no bar is in the sensor) in coil 23 at $f_2$ and compares it with a signal from solenoid driver 31, to which the demodulator is referenced in phase, and passes the demodulated signal through low pass filter 39 along line 40 to the transducer input module. The signal emerging from low pass filter 35 is transmitted to a transducer input module 41 along line 37. This signal is representative of the mean cross sectional area of the bar type material as previously explained. On the other hand the output of high pass filters 36 also transmitted to transducer input module 41 along line 38 is indicative of the size of deformations in the bar type material. The signal emerging from low pass filter 39 is transmitted to transducer input module 41 along line 40. This signal is used, as explained earlier, to provide minor correction for the increased skin depth at elevated manufacturing temperatures.

Bar temperature is derived from a sensor 43 which, for example, may be an optical or infrared pryrometer and transmitted to the transducer input module 41 along line 44. A bar speed transducer 46 such as a tachometer associated with one of the rollers 15a or 15b, or with one of the rollers in the rolling mill, produces a speed signal transmitted to transducer input module 41 along line 47.

Transducer input module 41 includes an analog to digital converter which sequentially receives analog input signals through a multiplexer and transmits the signal through an interface unit to processor module 51 which performs the algorithms indicated by the equations described above.

The operator interacts with processor module 51 through a control panel indicated by the dashed line 81. The control panel accepts operator inputs such as target (Desired) w/l and deformation height via thumbwhell driven digital potentiometers, or other types of digital I/O devices and includes a manual override switch allowing manual control of the mill.

The processor module compares the measured w/l and deformation size with the target values input by the operator and computes the deviation of the actual values from those desired. The digital deviation from the processor is transformed to analog signals by the digital to analog converter 61.

In order that the operator be able to form a judgment for operating the rolling mill or extruder, system information is displayed on meters 83 and strip chart recorder 76 which indicate a weight per unit length deviation target (either in % deviation or in actual deviation), which information is derived along lines 84, 85 from the digital to analog converter 61. An operator is not limited to the digital controls within block 82 but may communicate directly with the processor module 51 by means of optional but conventional input-output communications equipment 87 which includes input-output equipment such as teletypewriters.

When the operator desires automatic operation of the rolling mill or extruder he pushes the "auto" button in block 82. Digital to analog converter 61 then feeds the mill control unit 71 with both a deviation from desired weight per unit length signal along line 72 and a deviation from desired deformation size signal along line 73. The first signal results from the induced excitation signal at $f_1$, while the second results from the modulation produced on the former by means of deformation in the bar. The mill control unit 31 applies appropriate speed, pressure, and roll position changes to the mill or extruder 13 through control lines 74, 75 to cause the mill or extruder to reduce the deviations to zero.

Figure 3A:
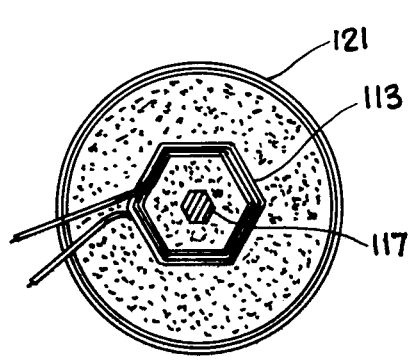
FIGS. 3a, 3b, 3c and 3d are end views of an excitation coil and a search coil co-axially surrounding elongated bar type material, with magnetic lines of flux indicated as small dots thereon.

For increased sensitivity the search coil described herein may have a shape which corresponds to the shape of the bar being measured. Thus, while the search coil has a generally closed shape which broadly approximates a circular path, in detail, it may preferably have a polygonal shape matching the shape of the solid bar type material to be measured. For example in FIG. 3a hexagonal bar type material (117) is seen surrounded by a hexagonal search coil 113, both coaxially within the excitation coil 121. A concentration of flux lines is seen to exist between bar type material 117 and search coil 113 with no flux line within the bar type material.

Figure 3B:
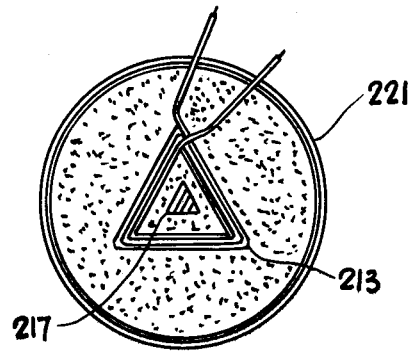

Similarly, FIG. 3b shows triangular bar type material 217 coaxially within search coil 213, both of which are within the excitation solenoid 221.

Figure 3C:
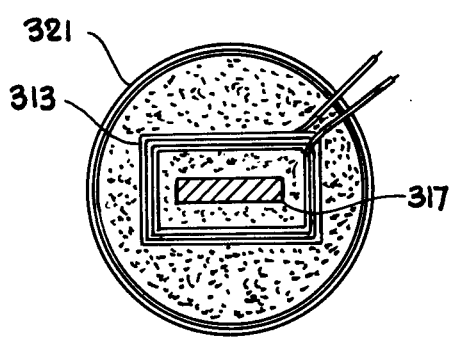
Figure 3D:
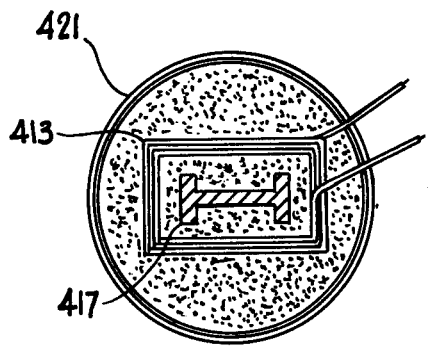

In FIG. 3c rectangular bar type material 317 is coaxially within a rectangular search coil 313 and both the bar 317 of the search coil 313 are coaxially within the excitation coil 321. Lastly, in FIG. 3d a bar 417 having an I-beam shape is placed in the central portion of a rectangular search coil 413 and the rectangular search coil has a centroid coaxial with the axis of the excitation coil 421. Again in each instance, a concentration of field lines is seen about the bar type material so that the field lines are excluded from the interior of the bar type material.

In the method and apparatus described herein, the bar type material need not be solid in order to exclude flux lines from the central portion thereof. Long tubes and hollow shapes with wall thickness considerably greater than the skin depth may therefore also be measured.

In the absence of other information the system will measure, display, and control the outer cross sectional area of the hollow material or shape. Since the density of the material is known, when the average mass per unit length is known from radiation sensors 48 such as X-Ray sensors or nuclear radiation sensors, see Section 18, McMaster, supra, incorporated by reference herein, the system will measure, display, and control the average wall thickness and outer cross sectional area of the hollow material. Alternatively, but with somewhat lesser precision, the wall thickness of hollow materials may be inferred from the known density of the material, the measured outer cross sectional area, and the known weight input to the system determined from a tachometer reading the rotational speed of idler roller 19a, 19b. Constant density and cross section of incoming material is assumed.

I claim:

1. Apparatus for determining instantaneous cross sectional area of moving elongated, conductive material comprising, first solenoid means axially surrounding a length of elongated, conductive material for generating an alternating magnetic field parallel to the length of the material, said field having a first frequency and a second, different frequency such that said field is substantially restrained from penetrating said material at selected material temperatures, at least one second solenoid means within said first solenoid means axially surrounding said material for sampling said magnetic field generated by said first solenoid means and producing a first output signal representative of said magnetic field through said second solenoid when said material is respectively removed and inserted axially into said second solenoid means and a processor module means connected to said second solenoid means for computing the ratio of said first output signal induced in said second solenoid means when said material is present in said second solenoid with a second signal induced in said second solenoid means when said material is absent in an area determining comparison relying on magnetic field displacement caused by the presence and absence of said material in said field, said processor means computing material cross sectional area at first and second frequencies for obtaining a true material cross sectional area independent of temperature.

2. The apparatus of claim 1 further including radio frequency demodulator means connected to said second solenoid and to said processor module means for separating low and high frequency signals sampled in said second solenoid means; said low frequency signal associated with the outer cross sectional area of the material; said high frequency signal associated with deformations on the outer surface of the material when said material is in motion axially with respect to said first and second solenoids.

3. The apparatus of claim 1 further defined by a temperature transducer means for measuring material temperature when said first and second frequencies are sampled in said second solenoid and producing a temperature signal proportional thereto, said temperature transducer means electrically connected to said processor means.

4. The apparatus of claim 3 further defined by a transducer means for measuring material speed through said first solenoid means and producing a speed signal proportional thereto, said material speed transducer means signal electrically connected to said processor means.

5. The apparatus of claim 4 wherein said processor module means is connected to an operator input-output means for setting desired signals in said processor module representative of a desired weight per unit length and desired deformation size.

6. The apparatus of claim 5 wherein said processor module means includes means for storing material densities and producing an arithmetically derived electrical weight per unit length deviation signal with reference to a desired signal from said operator input-output means.

7. The apparatus of claim 6 wherein said processor module further includes means for arithmetically producing an electrical deformation size deviation signal with reference to a desired signal from said operator input-output means.

8. The apparatus of claim 7 wherein the deformation size deviation signals and weight per unit length deviation signals produced by said processor module are transmitted to a material production control means electrically connected to said processor for controlling weight per unit length and deformation size.

9. The apparatus of claim 7 wherein said processor is connected to display means for recording and displaying weight per unit length computed by said processor, as well as weight per unit length deviation signals and deformation size deviation signals.

10. A method for measuring cross sectional area of elongated conductive material comprising,
generating an axial magnetic field having a first frequency and a second, different frequency, both of said frequencies being sufficiently high that the magnetic field is substantially restrained from penetrating said conductive material when said material is disposed in said field,
axially disposing a solenoidal coil in said field,
axially disposing an elongated, conductive material in said solenoidal coil,
measuring the flux of said magnetic field through said coil at one of said frequencies with said material in and out of said coil,
electrically comparing said measured field flux without and with said material in the coil in an area determining comparison relying on magnetic field displacement,
measuring the flux of said magnetic field through said solenoidal coil with said material in the field for each frequency, and
electrically comparing said magnetic flux measurements in a bar penetration corrected area determining comparison, for obtaining a true material cross sectional area.

11. The method of claim 10 wherein said area determining comparison is in accord with the equation $$A_k = A_{1k}\left[1 + \frac{1 - \frac{A_{2K}}{A_{1K}}}{\left(\frac{f_1}{f_2}\right)^1 - 1}\right]$$

where:

$A_K$ is the true area; $A_{1K}$ is the area measured at $f_1$; $A_{2K}$ is the area measured at $f_2$; $f_1$ and $f_2$ are the frequencies of the radio frequency magnetic fields used in the field displacement measurement; and $f_1$ is higher than $f_2$.

* * * * *